Patented May 26, 1936

2,041,838

UNITED STATES PATENT OFFICE 2,041,838

1 - (β - HYDROXYETHYLAMINO) - 5 - NAPHTHOL AND PROCESS OF PREPARING SAME

Arthur Howard Knight, Ashton-on-the-Mersey, England, assignor to Imperial Chemical Industries Limited, a corporation of Great Britain No Drawing. Original application November 15, 1933, Serial No. 698,222. Divided and this application November 20, 1934, Serial No. 753,899. In Great Britain November 17, 1932

5 Claims. (Cl. 260—128)

This application is a division of my copending application Serial No. 698,222, filed November 15, 1933.

My present invention relates to the manufacture of a new dyestuff intermediate.

According to this invention I treat 1-amino-5-naphthol with ethylene chlorohydrin in an aqueous solution containing a mild alkali (such as calcium carbonate, sodium carbonate, potassium carbonate, trisodium phosphate, sodium acetate), and I thus obtain the hitherto unknown 1-β-hydroxyethylamino - 5 - naphthol in good yield. This compound has the formula:

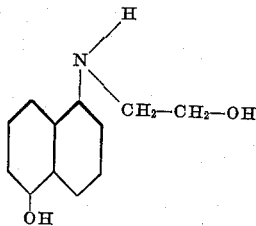

It is particularly useful for the production of new azo dyestuff by coupling thereto suitable diazo compounds in acid or alkaline medium.

The invention is illustrated but not limited, by the following examples in which the parts are by weight.

Example I 31.8 parts of 1-amino-5-naphthol, 10.5 parts of chalk (calcium carbonate), 51 parts of aqueous ethylene-chloro-hydrin of 33.5% strength, and 50 parts of methylated spirits are mixed and boiled for 5 hours under a reflux condenser. A nearly clear solution is formed but on cooling the desired product crystallizes. It is filtered off, washed and dried. The new product is a greyish powder.

Example II

The product of Example I is obtained in purer form and more expeditiously by operating as follows:

31.8 parts of 1-amino-5-naphthol, 30 parts of chalk, and 240 parts of aqueous ethylene-chlorohydrin of 33.5% strength are boiled together for 2½ hours. By so using a considerable excess of ethylene-chlorohydrin and by suitably adjusting the reaction time a product free from unchanged aminonaphthol is obtained. The reaction mixture is filtered while it is still hot, and deposits an oily layer which crystallizes on cooling. The crystals are removed and are almost pure 1-β-hydroxyethylamino-5-naphthol of formula

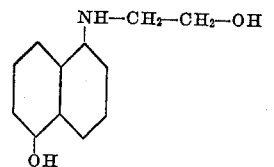

The compound is easily crystallized from aqueous alcohol. It then forms almost colorless crystals of m. p. 144° C.

It will be understood that my invention is susceptible of various modifications without departing from the spirit thereof.

I claim:

1. A process for the manufacture of a new coupling component for azo dyes which comprises reacting 1-amino-5-naphthol and ethylene chlorohydrin in the presence of a mild alkali in an aqueous medium.

2. A process as claimed in claim 1, in which the mild alkali is calcium carbonate.

3. A process for the manufacture of 1-β-hydroxyethylamino-5-naphthol which comprises heating together under reflux 1-amino-5-naphthol, calcium carbonate, and aqueous ethylene chlorohydrin, thereafter cooling the mixture and separating the crystalline precipitate.

4. 1-β-hydroxyethylamino-5-naphthol of the formula:

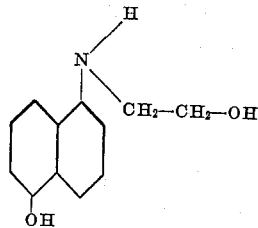

5. The process which comprises heating together at boiling temperature substantially 31.8 parts of 1-amino-5-naphthol, 30 parts of chalk and 80 parts of ethylene-chlorohydrin in the form of an aqueous solution, for about 2½ hours, filtering the reaction mass while still hot, cooling the filtrate, and recovering therefrom 1-β-hydroxyethylamino-5-napthol.

ARTHUR HOWARD KNIGHT.